United States Patent
Miller et al.

(10) Patent No.: US 9,516,492 B2
(45) Date of Patent: Dec. 6, 2016

(54) APPARATUS AND METHOD FOR DETECTING A PERSONAL COMMUNICATION DEVICE IN A VEHICLE

(71) Applicant: FORD GLOBAL TECHNOLOGIES, LLC, Dearborn, MI (US)

(72) Inventors: Thomas Lee Miller, Ann Arbor, MI (US); Robert Bruce Kleve, Dearborn, MI (US); Brian Bennie, Sterling Heights, MI (US); Anthony Gerald King, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/397,667

(22) PCT Filed: Apr. 30, 2013

(86) PCT No.: PCT/US2013/038821
§ 371 (c)(1),
(2) Date: Oct. 29, 2014

(87) PCT Pub. No.: WO2013/165989
PCT Pub. Date: Nov. 7, 2013

(65) Prior Publication Data
US 2015/0126171 A1    May 7, 2015

Related U.S. Application Data

(60) Provisional application No. 61/640,406, filed on Apr. 30, 2012.

(51) Int. Cl.
*H04W 4/04* (2009.01)
*H04W 8/22* (2009.01)
(Continued)

(52) U.S. Cl.
CPC ............. *H04W 8/22* (2013.01); *H04B 5/0025* (2013.01); *H04L 67/125* (2013.01);
(Continued)

(58) Field of Classification Search
CPC ...... H04M 1/66; H04M 1/725; H04M 1/6075; H04M 3/53; H04W 4/008; H04W 4/046; H04W 4/027; G01S 19/14; G01S 19/4142; H04L 67/125
(Continued)

(56) References Cited

U.S. PATENT DOCUMENTS 6,353,778 B1    3/2002    Brown
7,697,917 B2    4/2010    Camp, Jr. et al.
(Continued)

FOREIGN PATENT DOCUMENTS

CN    1535221 A    10/2004
CN    101507250 A    8/2009
(Continued)

OTHER PUBLICATIONS

International Search Report and Written Opinion for corresponding Application No. PCT/US2013/038821, Aug. 16, 2013, 8 pages.
(Continued)

*Primary Examiner* — William Nealon
(74) *Attorney, Agent, or Firm* — Brooks Kushman P.C.; Jennifer M. Stec

(57) ABSTRACT

An apparatus for detecting a personal communication device (PCD) in a vehicle is provided. The apparatus includes one or more near field communication (NFC) devices positioned about a driver zone of the vehicle for being wirelessly coupled to the PCD. The PCD is configured to (i) determine if the vehicle is moving above a predetermined vehicle speed, (ii) wirelessly transmit a first signal to the one or more NFC devices in the vehicle, and (iii) determine that the PCD
(Continued)

is positioned in the driver zone of the vehicle in response to a second signal from the one or more NFC devices.

12 Claims, 6 Drawing Sheets

(51) Int. Cl.
*H04B 5/00* (2006.01)
*H04L 29/08* (2006.01)
*H04W 4/00* (2009.01)
*H04M 1/725* (2006.01)
*H04M 1/60* (2006.01)

(52) U.S. Cl.
CPC ....... *H04M 1/72577* (2013.01); *H04W 4/001* (2013.01); *H04W 4/008* (2013.01); *H04W 4/046* (2013.01); *H04M 1/6091* (2013.01); *H04M 2250/04* (2013.01)

(58) Field of Classification Search
USPC ...... 455/417, 418, 565, 456.4, 426.1, 414.1; 340/466
See application file for complete search history.

(56) References Cited

U.S. PATENT DOCUMENTS

| | | | |
|---|---|---|---|
| 8,432,260 B2 | 4/2013 | Talty et al. | |
| 8,718,866 B2 | 5/2014 | Miller et al. | |
| 2007/0032225 A1* | 2/2007 | Konicek | H04M 1/72513 455/417 |
| 2008/0064446 A1* | 3/2008 | Camp | H04M 1/66 455/565 |
| 2009/0002147 A1* | 1/2009 | Bloebaum | H04M 1/6075 340/466 |
| 2011/0039581 A1* | 2/2011 | Cai | G01S 19/14 455/456.4 |
| 2011/0105097 A1 | 5/2011 | Tadayon et al. | |
| 2011/0137520 A1 | 6/2011 | Rector et al. | |
| 2011/0195699 A1* | 8/2011 | Tadayon | H04B 5/0062 455/418 |
| 2011/0210830 A1* | 9/2011 | Talty | H04B 5/0031 340/10.51 |
| 2011/0296037 A1 | 12/2011 | Westra et al. | |
| 2011/0298924 A1* | 12/2011 | Miller | H04M 1/6075 348/148 |
| 2011/0300843 A1 | 12/2011 | Miller et al. | |
| 2011/0301780 A1 | 12/2011 | Miller et al. | |
| 2012/0040665 A1* | 2/2012 | Liu | H04W 4/008 455/426.1 |
| 2012/0289215 A1 | 11/2012 | Elliott et al. | |
| 2013/0260725 A1* | 10/2013 | Sharma | H04W 4/027 455/414.1 |

FOREIGN PATENT DOCUMENTS

| | | |
|---|---|---|
| CN | 102170299 A | 8/2011 |
| WO | 2009105666 A1 | 8/2009 |
| WO | 2011010181 A1 | 1/2011 |

OTHER PUBLICATIONS

International Preliminary Report on Patentability for corresponding Application No. PCT/US2013/038821, Dec. 23, 2014, 6 pages.
Benden et al., "Teen Driver Cell Phone Blocker", University Transportation Center for Mobility, UTCM Project #10-15-47, Feb. 2012, 54 pages.
Ford Motor Company, "SYNC with Navigation System", Owner's Guide Supplement, SYNC System Version 1, Jul. 2007, 164 pages.
Ford Motor Company, "SYNC", Owner's Guide Supplement, SYNC System Version 1, Nov. 2007, 86 pages.
Ford Motor Company, "SYNC with Navigation System", Owner's Guide Supplement, SYNC System Version 2, Oct. 2008, 194 pages.
Ford Motor Company, "SYNC", Owner's Guide Supplement, SYNC System Version 2, Oct. 208, 83 pages.
Ford Motor Company, "SYNC with Navigation System", Owner's Guide Supplement, SYNC System Version 3, Jul. 2009, 196 pages.
Chinese Office Action for corresponding Application No. 2013800198783, mailed Jan. 5, 2016, 10 pages.
Chinese Office Action and English translation for corresponding Application No. 201380019878.3, mailed Aug. 31, 2016, 21 pages.

* cited by examiner

APPARATUS AND METHOD FOR DETECTING A PERSONAL COMMUNICATION DEVICE IN A VEHICLE

CROSS-REFERENCE TO RELATED APPLICATION

This application is the U.S. national phase of PCT Application No. PCT/US13/038821 filed on Apr. 30, 2013, which claims the benefit of U.S. provisional Application No. 61/640,406 filed on Apr. 30, 2012, the disclosures of which are incorporated in their entirety by reference herein.

TECHNICAL FIELD

Embodiments of the present disclosure generally relate to, among other things, an apparatus and method for detecting a personal communication device in a vehicle.

BACKGROUND

One example of locating a personal communication device (PCD) is set forth in co-pending U.S. Publication No. 2011/0301780 ("the '780 Publication") to Miller et al. The '780 Publication discloses a system including a controller that is configured to receive a first signal indicative of a location of at least one PCD in a vehicle and to determine whether the at least one PCD is located within one of a driver zone and a passenger zone. The driver zone corresponds to a location in the vehicle generally occupied by a driver and the passenger zone corresponds to a location in the vehicle generally occupied by at least one passenger. The controller is further configured to receive a second signal indicative of at least one occupant being positioned in at least one of the driver zone and the passenger zone and to store data corresponding to a modified driver zone that includes the driver zone and at least a portion of the passenger zone in response to determining that the at least one PCD is located in the driver zone and the second signal indicating that a first occupant is in the driver zone and a second occupant is not detected within the passenger zone.

SUMMARY

An apparatus for detecting a personal communication device (PCD) in a vehicle is provided. The apparatus includes one or more near field communication (NFC) devices positioned about a driver zone of the vehicle for being wirelessly coupled to the PCD. The PCD is configured to (i) determine if the vehicle is moving above a predetermined vehicle speed, (ii) wirelessly transmit a first signal to the one or more NFC devices in the vehicle, and (iii) determine that the PCD is positioned in the driver zone of the vehicle in response to a second signal from the one or more NFC devices.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Figure 1:
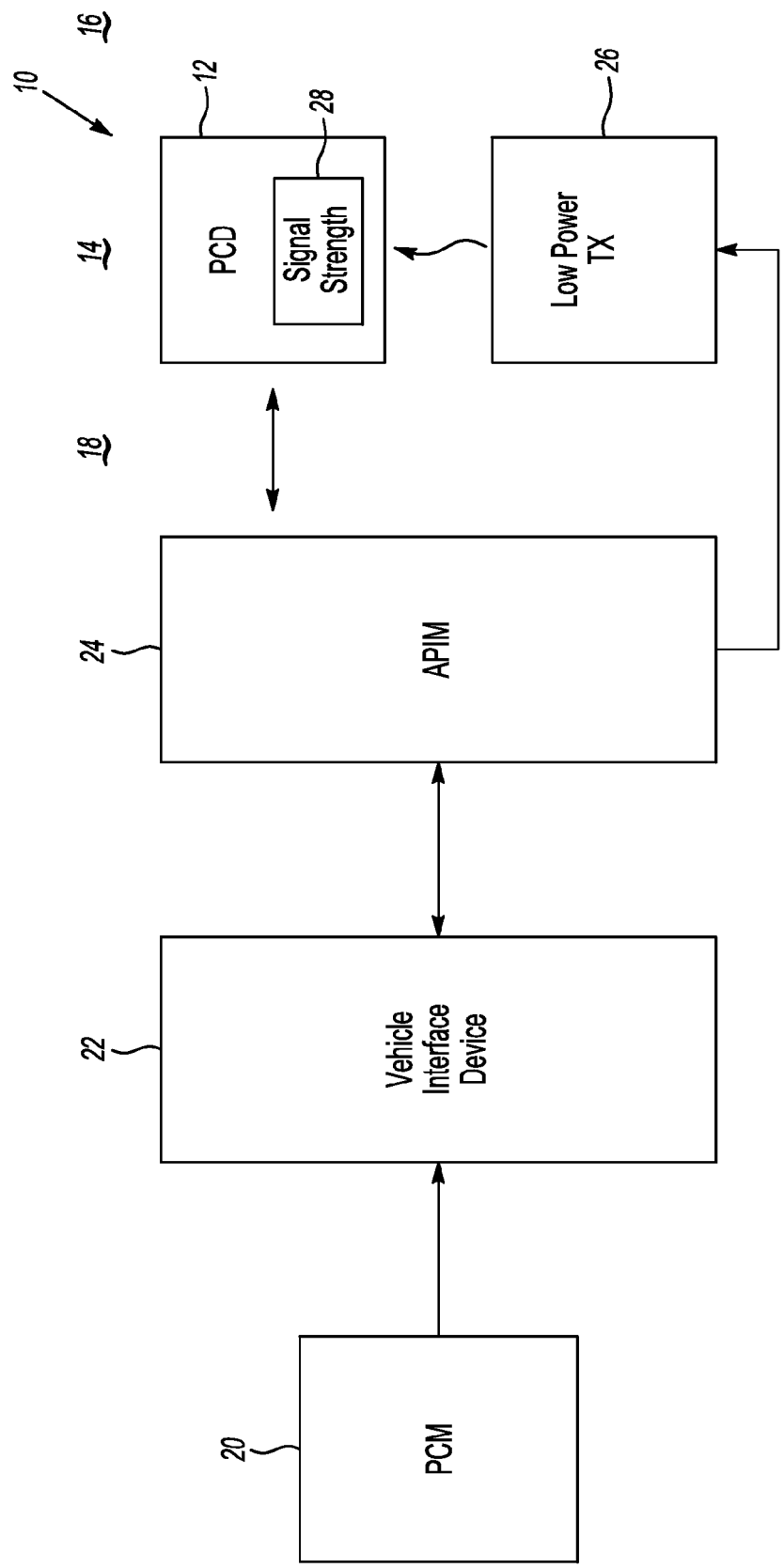
FIG. 1 depicts an apparatus for detecting a location of a personal communication device (PCD) in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein.

Distracted driving caused by manual interaction with a personal communication device (PCD) (e.g., cell phone or other suitable mechanism) is generating social interest. Third party applications have been developed to mitigate PCD usage while driving. These applications may implement a trigger to determine if the user of the PCD is operating a vehicle and if so, then the application may restrict various functions of the phone. For example, the distracted driving application may restrict manual operation of the phone. These restrictions may also filter incoming calls and text messages.

One example of a trigger is the PCD's ability to measure global positioning system (GPS) speed. The PCD may utilize an integrated GPS chip to determine if the PCD is moving at speeds indicating vehicle use (typically greater than 10 mph). By using GPS speed, the PCD may not be able to determine if the user of the PCD is a driver or a passenger, or whether the user of the PCD is located in a vehicle, taxi, bus, or train, etc. Some applications may address these aspects by allowing the user to temporarily override the restrictions. However, such a condition may defeat the purpose of the application. Further, by using GPS speed as a trigger, the driver may simply disable GPS measurement on the PCD in an effort to defeat it. In this case, the driver may not only seek to disable GPS to defeat the restrictions, but to also preserve PCD battery life.

While alerts may be provided to indicate that a trigger has been disabled (or defeated), these alerts may be easily explained away by the user. As noted, research has shown that people may bypass PCD restrictions if given the opportunity. One publication entitled "Teen Driver Cell Phone Blocker" by Mark Benden, Rainer Fink, and James Stafford, under University Transportation Center for Mobility (UTCM) Project #10-15-47 (February 2012) (see: http://utcm.tamu.edu/publications/final_reports/Benden_10-15-47.pdf) indicates that there is an apparent lack of interest in districted driving applications. To demonstrate this lack of interest, the above publication notes in its study, that the authors were unable to recruit test subjects despite offering a $100 incentive and a free device. Of those recruited, only 46% participated for the entire 12 months while the remaining 54% dropped out. The above publication illustrates the market's resistance to distracted driving technologies and the challenges associated with implementing them on a large scale. This resistance is indicative of how PCDs have become integrated into our daily lives and perhaps could be considered an addiction.

Distracted driving caused by manual interaction with PCDs may be of interest. Existing solutions require PCD users to optionally add restrictive functionality to their phones which may come at a nominal cost. Furthermore, such restrictions are completely voluntary given the inability to differentiate between a driver and a non-driver. Perhaps the most alarming aspect of distracted driving is the refusal of users to refrain from manually interacting with their cell phones despite the known risk to themselves and others.

FIG. 1 depicts an apparatus 10 for detecting a location of a personal communication device (PCD) 12 in a vehicle 18 in accordance to one embodiment. The apparatus 10 may be used to determine whether the PCD 12 is located in a driver zone 14 or in a passenger zone 16 of the vehicle 18. The driver zone 14 corresponds to a location in the vehicle 18 generally occupied by a driver and the passenger zone 16 corresponds to a location in the vehicle 18 generally occupied by at least one passenger. In general, it may be preferable to restrict PCD usage in the event the PCD 12 is detected to be in the driver zone 14 and/or other factors are met such as the vehicle 18 being in moving state (e.g., vehicle speed>predetermined speed or transmission status indicates that the vehicle 18 is moving).

The apparatus 10 includes a powertrain control module (PCM) (or engine controller) 20, a vehicle interface device (or device) 22, and an auxiliary protocol interface module (APIM) 24. The device 22 may be implemented as an interface device which provides information related to various states of vehicle functionality to the driver. For example, the device 22 may be implemented as a display and/or audible mechanism that provides status or warning messages to the driver and/or as a switch device (e.g., touch screen, voice input, or other suitable device) that enables the driver to select various vehicle functions.

The engine controller 20, the device 22, and the APIM 24 may transmit signals to/from one another via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

The PCM 20 may transmit vehicle speed information and transmission status to the device 22 over the data communication bus. The device 22 may then transmit vehicle speed information and transmission status to the APIM 24. The relevance of this aspect will be discussed in more detail below.

The APIM 24 may be wirelessly coupled to any number of the PCDs 12 via a Bluetooth protocol or other suitable interface. Each PCD 12 may be a cell phone. The APIM 24 is part of an in-vehicle communication system (and includes at least one transmitter (not shown) and at least one receiver (not shown)) which interfaces with each PCD 12 to enable voice input control to perform a function with the PCD 12 so that the driver does not have to enter data directly into the PCD 12. The APIM 24 may interface with switches (not shown) positioned within the vehicle 18 to enable touch selection control to perform a function with the PCD 12 so that the driver does not have to enter data directly into the PCD 12. In one example, the APIM 24 may be implemented as part of the SYNC system developed by Ford Motor Company® and Microsoft®. Switches may be positioned on the vehicle interface device 22, the APIM 24, or the vehicle's steering wheel to enable touch input.

A Bluetooth® transmitter 26 ("transmitter") is generally positioned about the driver zone 14 of the vehicle 18. In one example, the transmitter 26 may operate at a low power and operate at a low range. The transmitter 26 may be implemented in accordance to Bluetooth Low Energy (BLE) (or Bluetooth 4.0) to reduce power consumption thereof. In general, the transmitter 26 may be a BLE transmitter 26 and wirelessly transmit signals to a receiver (not shown) of the PCD 12. In one example, the transmitter 26 may transmit a signal to the PCD 12 indicating manufacturer specific data that may be specific to the vehicle such data indicating that the driver is in the driver seat or in the driver zone 14, etc. In general, the transmitter 26 may be strategically located in the vehicle 18 to limit coverage to the driver's seat (or some other area indicative of where a driver is generally positioned in the vehicle 18). Thus, in the event the PCD 12 receives the data from the transmitter 26, the PCD 12 determines that the vehicle occupant is in the driver zone 14 and activates restrictions such as but not limited to preventing PCD usage or requiring voice control operation to prevent driver distraction.

The PCD 12 may also include a signal strength circuit 28 for measuring the signal strength of the signal as received from the transmitter 26. In the event received signal strength of the signal as received from the PCD 12 exceeds a predetermined threshold level, the PCD 12 may then determine that the PCD 12 is in the driver zone 14 and activate restrictions thereof. The predetermined level may be set to a value that increases the resolution of the PCD's 12 to accurately detect whether the driver is actually positioned in the driver zone 14 in the event the position of the transmitter 26 is prone to provide some degree of coverage into the passenger zone 16.

Figure 2:
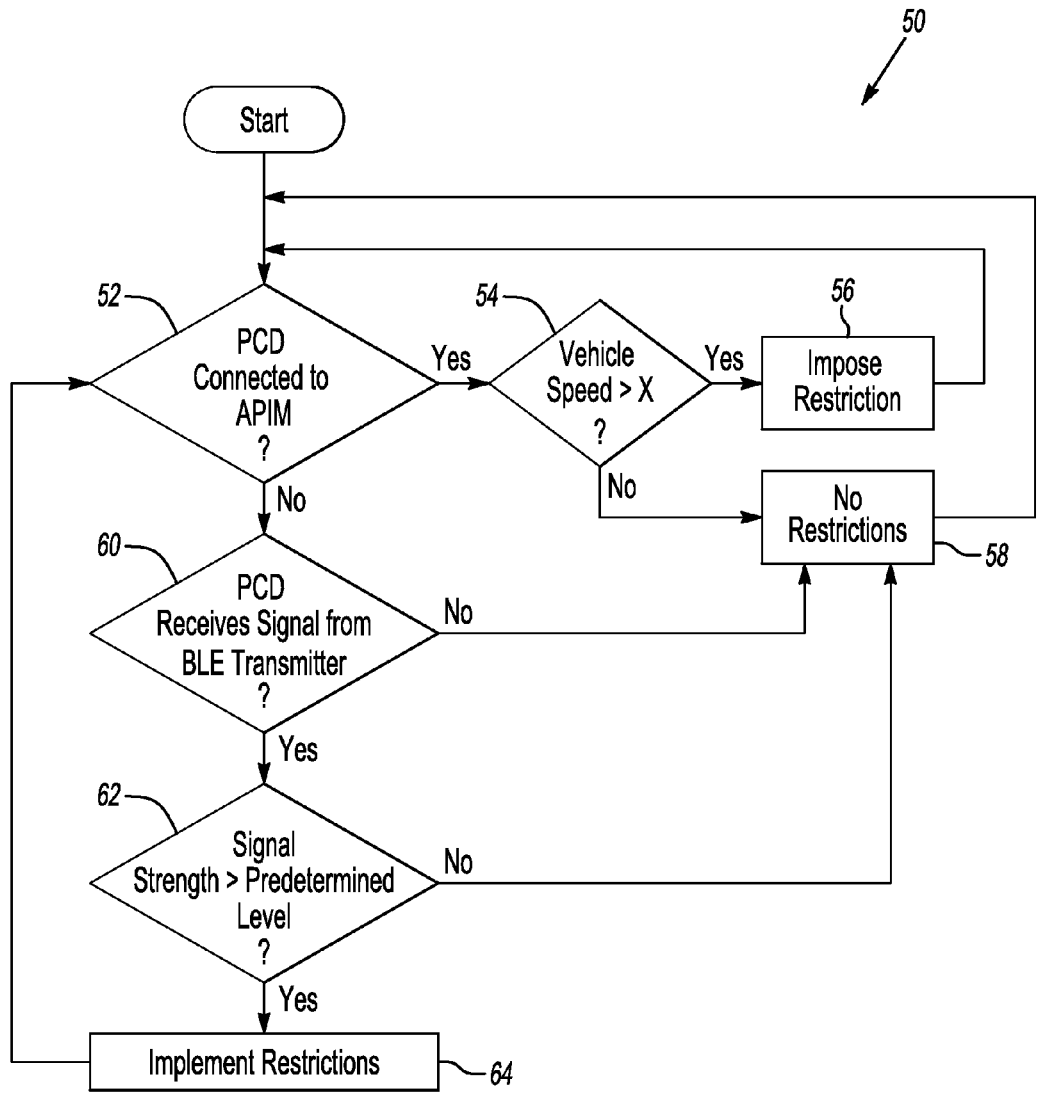
FIG. 2 depicts a method for locating the PCD and for imposing restrictions thereof for the apparatus of FIG. 1.

FIG. 2 depicts a method 50 for locating the PCD 12 and for imposing restrictions thereof for the apparatus 10 of FIG. 1.

In operation 52, the APIM 24 determines whether a PCD 12 is electrically coupled thereto such that the APIM 24 acts as an interface between the vehicle 18 and the PCD 12. If the APIM 24 is electrically coupled to the PCD 12, then the method 50 moves to operation 54. If not, then the method 50 moves to operation 60.

In operation 54, the APIM 24 determines whether the vehicle speed is greater than a predetermined vehicle speed or whether the vehicle 18 is in a moving state (e.g., transmission status indicates the vehicle 18 is out of Park). If this condition is true, then the method 50 moves to operation 58. If not, then the method 50 moves to operation 58.

In operation 56, the APIM 24 imposes restrictions such as but not limited to requiring voice input control (or hands free mode or operation) of the PCD 12 and prevents the driver from manipulating switches on the PCD 12.

In operation 58, the APIM 24 may allow the driver to utilize switches on the PCD 12 as the vehicle is determined to be in a stationary or non-moving state.

In operation 60, the APIM 24 may then activate the transmitter 26 to transmit a signal to the PCD 12 to determine if the driver is located in the driver zone 14. This condition may indicate that the driver may not have paired his/her PCD 12 to the APIM 24 to establish communication therewith in an attempt to avoid PCD 12 restrictions. If the PCD 12 receives the signal from the APIM 24, then the method 50 moves to operation 62. If PCD 12 does not receive the signal from the APIM 24, then the method 50 moves to operation 58. This condition generally indicates that the driver does not have a PCD 12 or that the PCD 12 may be turned off, deactivated, or simply that a PCD 12 is not detected in the driver zone 14.

In operation 62, the PCD 12 determines whether the signal as received from the transmitter 26 exceeds a predetermined strength level. If this condition is true, then the method 50 moves to operation 64. If not, then the method 50 moves to operation 58. If the method 50 moves to operation 58, the PCD 12 determines that it is more than likely positioned in the passenger zone 16 since the transmitter 26 itself is positioned in the vehicle 18 to provide coverage for the PCD 12 in the driver zone 14.

In operation 64, the PCD 12 imposes restrictions such as, but not limited to, requiring voice input control (or hands free operation) of the PCD 12 and prevents the driver from manipulating switches on the PCD 12.

Figure 3:
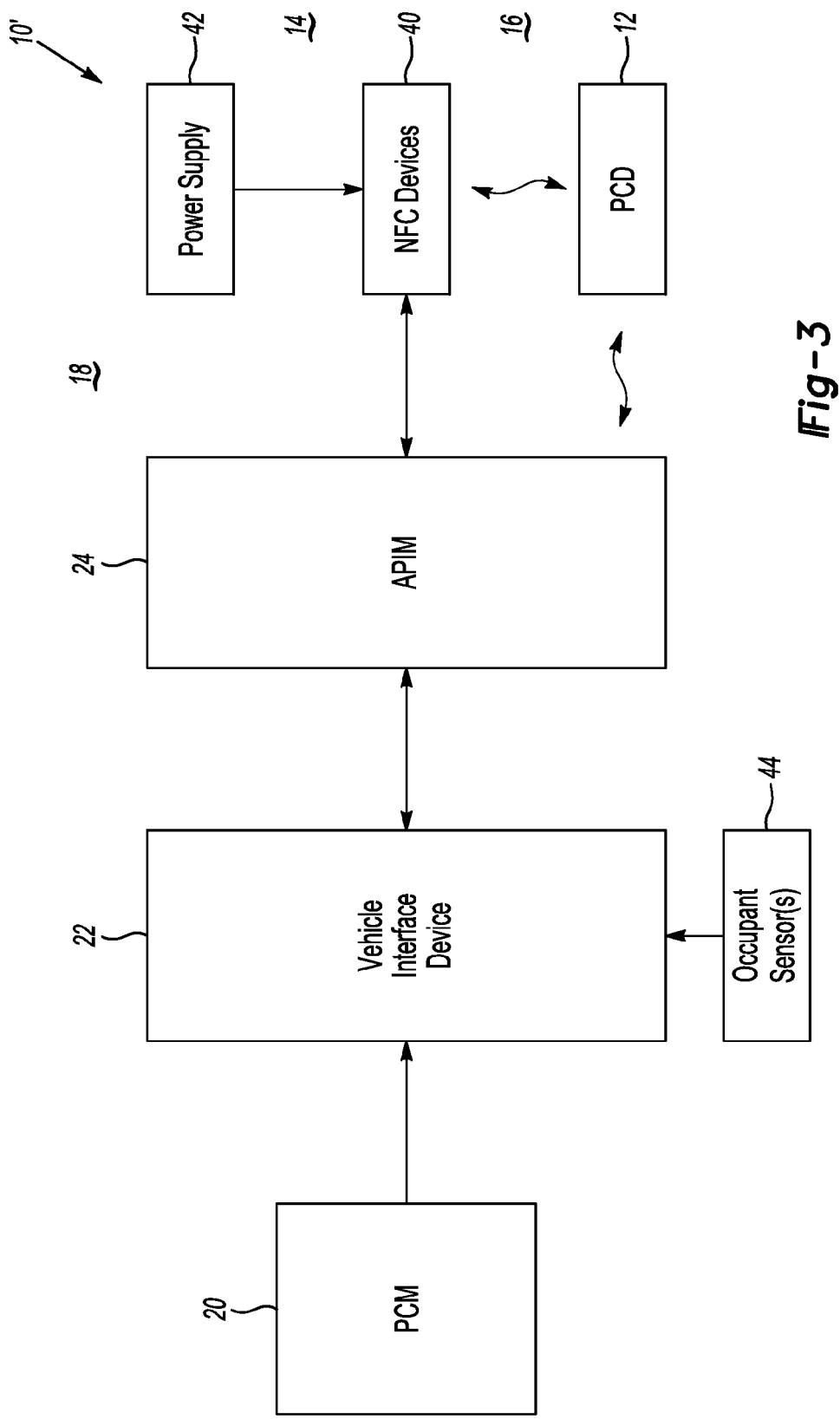
FIG. 3 depicts an apparatus for detecting a location of the PCD in accordance to another embodiment.

FIG. 3 depicts an apparatus 10' for detecting a location of the PCD 12 in accordance to another embodiment. The apparatus 10' is generally configured to determine which zone (e.g., driver zone 14 or passenger zone 16) the PCD 12 is located in within the vehicle 18. One or more near field communication (NFC) devices 40 may be positioned throughout the driver zone 14 and/or the passenger zone to enable the vehicle 18 to determine which zone the PCD 12 is located in. NFC generally uses a standardized radio interface (e.g., 13.56 MHz) to allow devices to communicate when brought in close proximity to each other. The NFC devices 40 may be implemented as either active or passive.

If the NFC device 40 is active, then the active NFC device 40 is powered and can include an electromagnetic field for transmission to the PCD 12. Likewise, the PCD 12 is capable of generating a signal which also includes the electromagnetic field for transmission to the active NFC device 40. In general, the active NFC device 40 and the PCD 12 may deactivate a radio frequency (RF) field while waiting for data. In the active communication mode, each of the PCD 12 and the active NFC device 40 may be powered. For example, the PCD 12 generally includes a battery for powering the same. A power supply 42 is provided to power the active NFC devices 40. In this case, the power supply 42 powers the active NFC devices 40 to enable the same to wirelessly transmit a signal to another device (e.g., the PCD 12). In general, active NFC devices 40 exhibit longer ranges with respect to transmitting a signal therefrom when compared to passive NFC devices 40 since they are powered.

The PCD 12 may impose various restrictions thereof in response to receiving a signal from anyone of the active NFC devices 40. In this example, the active NFC devices 40 may be positioned in the driver zone 14 and a signal received from the active NFC device 40 in the driver zone 14 may serve to indicate that the driver is positioned in the driver zone 14. Additional inputs may be monitored and transmitted to the NFC devices 40 from the vehicle 18 (e.g., the APIM 24) such as vehicle speed and/or transmission status. In the event the PCD 12 receives information from any one or more of the active NFC devices 40 and the PCD 12 also receives a signal from APIM 24 that indicates that the vehicle 18 is in a moving state (e.g., vehicle speed above predetermined threshold or transmission status is in reverse, drive, etc.), then the PCD 12 may implement restrictions thereof to minimize driver distraction.

Additional embodiments may include positioned the active NFC devices 40 in both the driver zone 14 and the passenger zone 16 and utilize information from an occupant sensor 44. For example, the occupant sensor 44 may be positioned in a front seat of the vehicle 18 and provide status as to whether a passenger is positioned thereon. In the event, the passenger is not detected in the passenger zone 16, the active NFC device(s) 40 positioned in the passenger zone 16 (e.g., positioned about the front passenger seat in the passenger zone 16) may then transit a signal indicating that the active NFC device(s) 40 is in the driver zone 14 such that the PCD 12 restricts usage thereof when the vehicle 18 is moving. This condition may be used to prevent a driver from leaning over into the passenger zone 16 to use his/her PCD without any restrictions. Each of the active NFC devices 40 may be configured to transmit data indicating its corresponding position (e.g., driver zone 14 or passenger zone 16). In the event the above condition is met (i.e., a passenger is not located in the passenger zone 16), then the active NFC device 40, while positioned in the passenger zone 16, may then transmit data indicating that it is in the driving zone 14 to prevent the above condition. In this case, the device 22 may control the active NFC device 40 to switch the data that is transmitted to the PCD 12 if information from the occupant sensor 44 does not indicate that a passenger is located in the front passenger seat.

The passive NFC device 40 may receive a signal from another device (e.g., the PCD 12). In this case, the PCD 12 provides the signal with a carrier field and the passive NFC device 40 may draw power from an electromagnetic field within the signal from the PCD 12 to enable the passive NFC device 40 to wirelessly transmit a signal back to the PCD 12. With the passive NFC devices 40, the power supply 42 may not be utilized and the NFC devices 40 function as a tag to receive a signal from the PCD 12. In general, each passive NFC device 40 may be positioned about interior panels (not shown) about the driver zone 14 (e.g., at a steering wheel, driver door panel, center console, driver seat, etc.) for receiving the electrical output from the PCD 12.

In one example, in the event a passive NFC device 40 receives a signal from the PCD 12, the passive NFC device 40 may transmit a signal back to the PCD 12 to notify the PCD 12 of which zone the PCD 12 is located in. The PCD 12 may also receive vehicle speed and/or transmission status from the APIM 24 or use tower hopping or global positioning system (GPS) coordinates to determine whether the vehicle 18 is moving. In this case, the PCD 12 may impose restrictions to prevent usage thereof in the event the vehicle 18 is moving. If the vehicle speed is less than the predetermined vehicle speed and/or the transmission status indicates that the vehicle is in a parked state, then the PCD 12 may allow the driver, while positioned in the driver zone 18 to engage in full use of the PCD 12.

Figure 4:
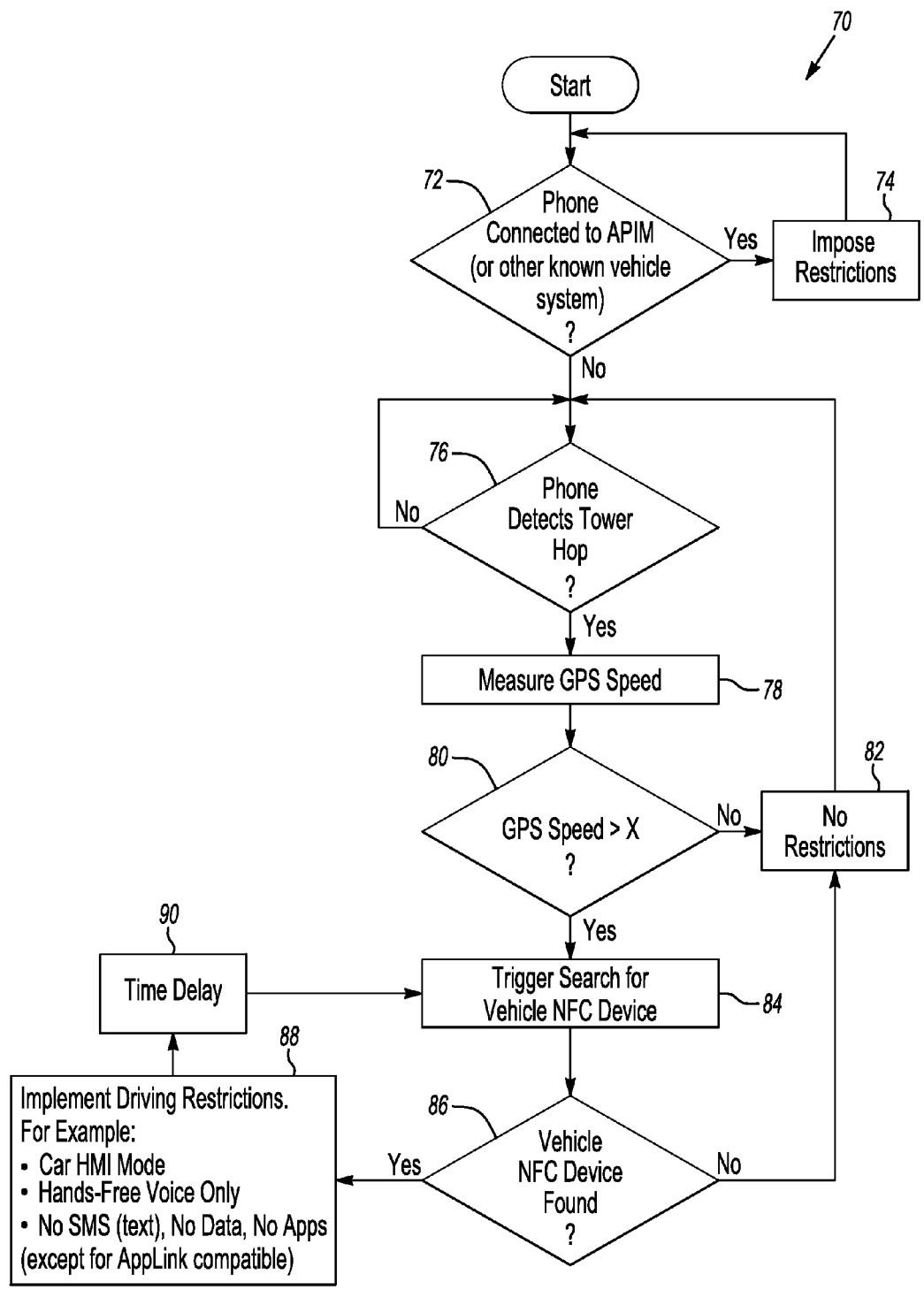
FIG. 4 depicts a method for triggering a PCD search in connection with an near field communication device (NFC) in accordance to one embodiment.

FIG. 4 depicts a method 70 for triggering a search of the PCD 12 in the vehicle 18 in connection with one or more of the NFC devices 40 in accordance to one embodiment.

In operation 72, the APIM 24 determines whether the PCD 12 is electrically coupled thereto such that the APIM 24 acts as an interface between the vehicle 18 and the PCD 12. If the APIM 24 is electrically coupled to the PCD 12, then the method 70 moves to operation 74. If not, then the method 70 moves to operation 76.

In operation 74, the APIM 24 imposes restrictions such as but not limited to requiring voice input control (or hands free operation) of the PCD 12 and prevents the driver from manipulating switches on the PCD 12 if the vehicle speed exceeds a predetermined vehicle speed and/or the vehicle is detected to be in a non-park mode.

In operation 76, the PCD 12 detects a tower hop. For example, the PCD 12 may monitor if it is moving from tower to tower to receive reception. If the PCD 12 determines that it is moving from tower to tower, this condition generally indicates that the PCD 12 (or the PCD 12 while in the vehicle 18) is moving. If this condition is true, then the method 70 moves to operation 78. If not, then the method 70 remains in operation 76.

In operation 78, the PCD 12 measures speed based on GPS coordinates. For example, the PCD 12 determines the speed at which the vehicle 18 is moving by calculating the rate at which the GPS coordinates change over time while the vehicle 18 is moving. If the PCD 12 determines that its speed (or the speed of the vehicle 18 while the PCD 12 is positioned therein) is less than a predetermined speed, then the method 70 moves to operation 82. If on the other hand the PCD 12 determines that its speed (or the speed of the vehicle 18 while the PCD 12 is positioned therein) is greater than the predetermined speed, then the method 70 moves to operation 84.

In operation 82, the PCD 12 will not impose any restrictions as the speed is less than the predetermined speed.

In operation 84, the PCD 12 may transmit a signal for receipt by one or more of the NFC devices 40 (active or passive) in the driver zone 14 to trigger a search for the NFC devices 40 in the vehicle 18.

In operation 86, the PCD 12 monitors for a signal to be transmitted by the NFC devices 40 to determine if the vehicle 18 is found after executing operation 84. As noted above, the NFC devices 40 are generally arranged to transmit information indicative of which zone the NFC device 40 is positioned within. In the event the PCD 12 receives information from a particular NFC device 40 indicating that the NFC device 40 is in the driver zone 14, then the PCD 12 effectively determines that it is in the vehicle 18 and that due to its close proximity to the NFC device 40 in the driver zone 14, then restrictions may be required. In this case, the method 70 moves to operation 88. If on the other hand the PCD 12 does not receive a signal back from the NFC device 40 or receive information indicating that the NFC device 40 is in the passenger zone 16, then the method moves to operation 82 where no restrictions are performed.

In operation 88, the PCD 12 restricts its operation thereof. For example, the PCD 12 may operate in a hands free operation mode (or voice control mode).

In operation 90, the PCD 12 executes a time delay while in the restricted state. Upon expiration of the time delay, the PCD 12 triggers another search as noted in operation 84 to determine if the PCD 12 is still in the vehicle 18 (or in the drivers zone 14).

Figure 5:
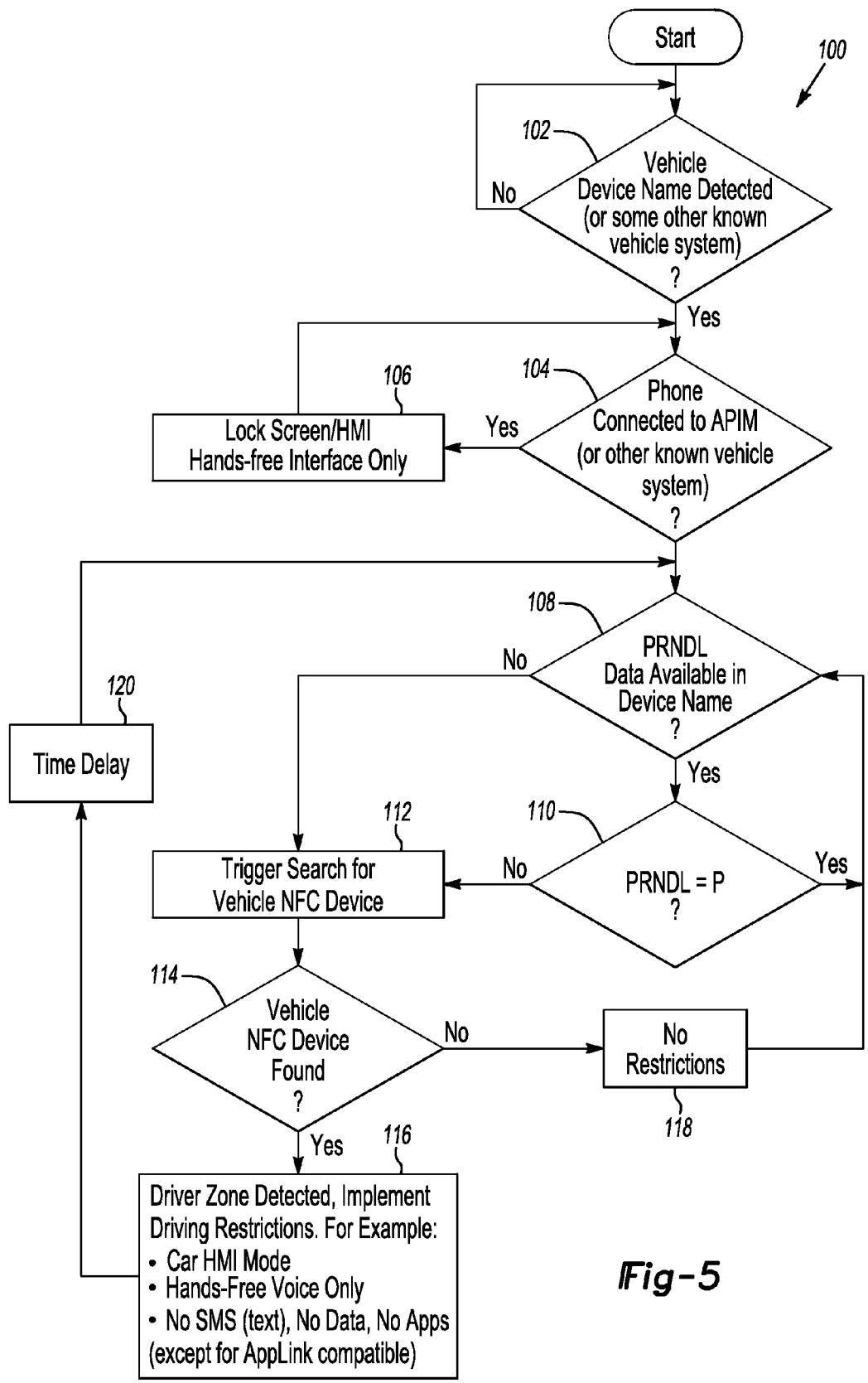
FIG. 5 depicts another method for triggering a PCD search in accordance to one embodiment.

FIG. 5 depicts another method 100 for triggering a PCD 12 search in accordance to one embodiment.

In operation 102, the PCD 12 monitors for a signal that is wirelessly transmitted by the APIM 24 thereto. In one example, the signal as transmitted from the APIM 24 may be a device name signal as set forth in co-pending U.S. application Ser. No. 13/566,309 ("the '309 application") as filed on Aug. 3, 2012 which is hereby incorporated by reference in its entirety. In general, the device name signal as transmitted from the APIM 24 serves to indicate, but not limited to, the origin of the transmitter.

The PCD 12 may recognize information from the device name signal to acknowledge that it is used as an identifier to identify that the vehicle 18 is the source of the transmitted signal. If the PCD 12 receives the device name signal (or other identifier), then the method 100 moves to operation 104. If not, then the method 100 stays in operation 102.

In operation 104, the PCD 12 determines whether it is connected to the APIM 24 or other device that is generally arranged to interface with the PCD 12 for controlling or enabling operation thereof in the vehicle 18. It is contemplated that each PCD 12 in the vehicle 18 may be arranged to receive the device name signal. However, this condition may not necessarily mean that the PCD 12 is paired with the vehicle 18 or under control of the APIM 24. A user is generally required to undergo additional operations to pair his/her PCD 12 to the APIM 24 so that the PCD 12 cooperates with the APIM 24. In some instances this has not been done.

If the PCD 12 determines that it is connected to the APIM 24 or other device for controlling or enabling operation thereof in the vehicle 18, then the method 100 moves to operation 106. If not, this condition indicates that the PCD 12 is not paired to the APIM 24 and the APIM 24 may not interface with the PCD 12 to control or enable operation of the PCD 12. The method 100 then moves to operation 108.

In operation 106, the PCD 12 may be restricted by the APIM 24 by virtue of it being found to be connected to the vehicle 18. This condition will depend on the type of implementation provided by the PCD 12 manufacturer. In one example, the PCD 12 while paired to the APIM 24 may receive vehicle speed and/or transmission status and restrict its operation thereof if the vehicle is detected to be moving.

In operation 108, the PCD 12 (e.g., unpaired PCD 12) monitors information on the device name signal for transmission status the vehicle 18 (e.g., whether the vehicle is in Park, Neutral, Drive, Low (PRNDL)). If this condition is true, then the method 100 moves to operation 110. If this condition is false, then the method 100 moves to operation 112.

In operation 110, the PCD 12 determines whether the vehicle is in park. If this condition is true, then there is no need to communicate with the NFC devices 40 to ascertain where the driver is located for the purpose of restricting PCD 12 usage. If this condition is not true, then the method 100 moves to operation 112.

In operation 112, the PCD 12 may transmit a signal for receipt by one or more of the NFC devices 40 (active or passive) in the driver zone 14 to trigger a search for the NFC devices 40 in the vehicle 18.

In operation 114, the PCD 12 monitors for a signal to be transmitted by the NFC devices 40 to determine if the vehicle 18 is found after executing operation 84. As noted above, the NFC devices 40 are generally arranged to transmit information indicative of which zone the NFC device 40 is positioned within. In the event the PCD 12 receives information from a particular NFC device 40 indicating that the NFC device 40 is in the driver zone 14, then the PCD 12 effectively determines that it is in the vehicle 18 and that due to its close proximity to the NFC device 40 in the driver zone 14, then restrictions may be required. In this case, the method 100 moves to operation 116 where restrictions are imposed with respect to the PCD 12. If on the other hand the PCD 12 does not receive a signal back from the NFC device 40 or receive information indicating that the NFC device 40 is in the passenger zone 16, then the method 100 moves to operation 118 where no restrictions are performed.

In operation 120, the PCD 12 executes a time delay (or starts a counter) while in the restricted state. Upon expiration of the time delay (or the counter reaches a predetermined time limit), the PCD 12 may trigger another search to determine if the PCD 12 is still in the vehicle 18 (or in the drivers zone 14) if the operation 108 is false or the operation 110 is false.

Figure 6:
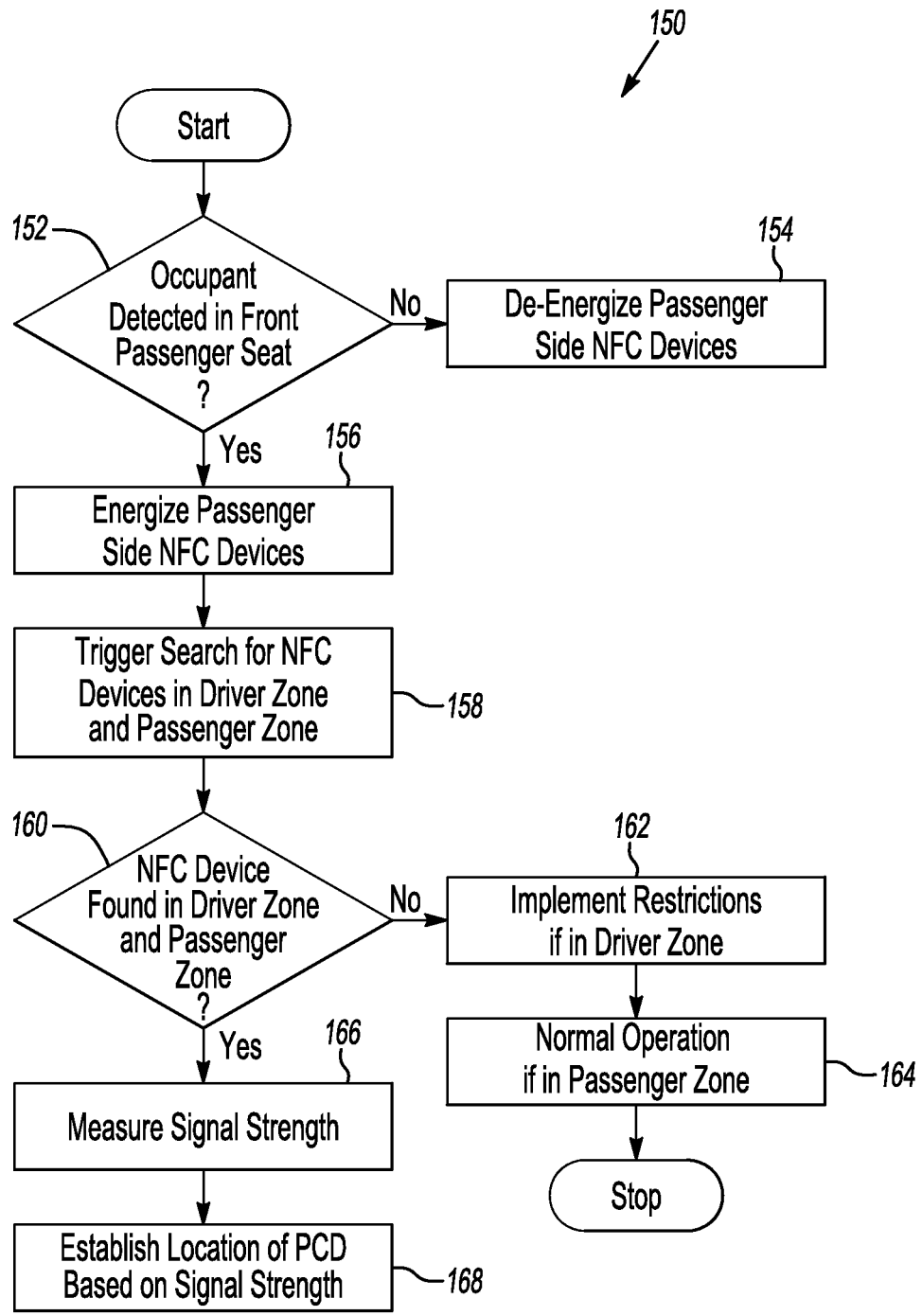
FIG. 6 depicts a method for locating the PCD in connection with an occupant sensor in accordance to one embodiment.

FIG. 6 depicts a method 150 for locating the PCD 12 in connection with the occupant sensor 44 in accordance to one embodiment. The method 150 may be used in connection with an apparatus that positions active NFC devices 40 in both the driver zone 14 and the passenger zone 16.

In operation 152, the vehicle interface device 22 determines whether a passenger is seated in the passenger zone 16 (or a front passenger seat of the vehicle 18). If this condition is not true, then the method 150 moves to operation 154. If this condition is true, then the method 150 moves to operation 156.

In operation 154, the vehicle interface device 22 will not energize the active NFC devices 40 positioned about the passenger zone 16.

In operation 156, the vehicle interface device 22 energizes the active NFC devices 40 positioned in the passenger zone 16.

In operation 158, the PCD 12 initiates a search for active NFC devices 40 in the driver zone 14 and the passenger zone 16.

In operation 160, the PCD 12 determines whether the active NFC devices 40 were found in each of the driver zone 14 and the passenger zone 16. If this condition is not true, then the method 150 moves to operation 162. If this condition is true, then the method 150 moves to operation 166.

In operation 162, the PCD 12 imposes restrictions thereof in the event the active NFC devices 40 were found only in the driver zone 14.

In operation 164, the PCD 12 resumes normal operation in the even the active NFC devices 40 were found only in the passenger zone 16.

In operation 166, the PCD 12 measures the signal strength of the signals received from the active NFC devices 40 in the driver zone 14 and the signals received from the active NFC device 40 in the passenger zone.

In operation 168, the PCD 12 establishes it location in the vehicle 18 based on which signals exhibit the highest signal strength. For example, in the event the PCD 12 determines that the signals received from the active NFC devices 40 in the driver zone 14 exhibit the largest signal strength, then the PCD 12 determines that it is in the driver zone 14 and may initiate restrictions. In the event the PCD 12 determines that the signals received from the active NFC devices 40 in the passenger zone 16 exhibit the largest signal strength, then the PCD 12 determines that it is in the passenger zone 16 and no restrictions will be imposed.

If the signal strength of the received signals from the driver zone 14 and the passenger zone 16 is equal, then the PCD 12 determines (or defaults) that it is positioned in the driver zone 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for detecting a personal communication device (PCD) in a vehicle, the apparatus comprising:
one or more near field communication (NFC) devices positioned about a driver zone of the vehicle for being wirelessly coupled to the PCD that is configured to (i) determine if the vehicle is moving above a predetermined vehicle speed, (ii) wirelessly transmit a first signal to the one or more NFC devices in the vehicle, (iii) determine that the PCD is positioned in the driver zone of the vehicle in response to a second signal from the one or more NFC devices, (iv) wirelessly receive a device name signal from a low power Bluetooth transmitter in the vehicle, wherein the device name signal indicates a transmission status of the vehicle and the PCD determines whether the vehicle is moving above the predetermined vehicle speed if the transmission status indicates that the vehicle is in a non-park mode, and (v) transmit the first signal to the one or more NFC devices in the vehicle in response to the transmission status indicating that the vehicle is in the non-park mode.

2. The apparatus of claim 1 wherein the PCD is further configured to operate in a hands free mode in response to receiving the second signal from the one or more NFC devices.

3. The apparatus of claim 2 wherein the PCD is further configured to initiate a counter while in the hands free mode and to retransmit the first signal to the one or more NFC devices in the vehicle upon an expiration of the counter.

4. The apparatus of claim 1 wherein the PCD is further configured to measure global positioning system (GPS) coordinates to determine if the vehicle is moving above the predetermined vehicle speed.

5. The apparatus of claim 4 wherein the PCD is further configured to wirelessly transmit the first signal to the one or more NFC devices in response to the GPS coordinates indicating that the vehicle is moving above the predetermined vehicle speed.

6. The apparatus of claim 1 wherein the one or more NFC devices are one of active and passive.

7. An apparatus comprising:
a near field communication (NFC) device positioned in a driver zone that is wirelessly coupled to a personal communication device (PCD) that is configured to (i) determine if a vehicle is moving, (ii) wirelessly transmit a first signal to the NFC device if the vehicle is moving, (iii) determine that the PCD is positioned in the driver zone of the vehicle in response to a second signal from the NFC device, (iv) wirelessly receive a device name signal from a low power Bluetooth transmitter in the vehicle, wherein the device name signal indicates a transmission status of the vehicle and the PCD determines that the vehicle is moving if the transmission status indicates that the vehicle is in a non-park mode, and (v) transmit the first signal to the NFC device in the vehicle in response to the transmission status indicating that the vehicle is in the non-park mode.

8. The apparatus of claim 7 wherein the PCD is further configured to operate in a hands free mode in response to receiving the second signal from the NFC device.

9. The apparatus of claim 8 wherein the PCD is further configured to initiate a counter while in the hands free mode and to retransmit the first signal to the NFC device in the vehicle upon an expiration of the counter.

10. The apparatus of claim 7 wherein the PCD is further configured to measure global positioning system (GPS) coordinates to determine if the vehicle is moving.

11. The apparatus of claim 10 wherein the PCD is further configured to wirelessly transmit the first signal to the NFC device in response to the GPS coordinates indicating that the vehicle is moving.

12. The apparatus of claim 7 wherein the NFC device is one of active and passive.

* * * * *